United States Patent
Murphy-Chutorian et al.

(10) Patent No.: US 10,417,277 B2
(45) Date of Patent: *Sep. 17, 2019

(54) RANKING AND SELECTING IMAGES FOR DISPLAY FROM A SET OF IMAGES

(71) Applicant: Google LLC, Mountain View, CA (US)

(72) Inventors: Erik Murphy-Chutorian, Palo Alto, CA (US); Matthew Steiner, Los Altos, CA (US); Jingyu Cui, Stanford, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/838,240

(22) Filed: Dec. 11, 2017

(65) Prior Publication Data

US 2018/0101549 A1 Apr. 12, 2018

Related U.S. Application Data

(63) Continuation of application No. 14/747,079, filed on Jun. 23, 2015, now Pat. No. 9,858,295.
(Continued)

(51) Int. Cl.
*G06F 17/30* (2006.01)
*G06F 16/583* (2019.01)
(Continued)

(52) U.S. Cl.
CPC .......... *G06F 16/5838* (2019.01); *G06K 9/46* (2013.01); *G06K 9/52* (2013.01); *G06K 9/6267* (2013.01); *G06Q 10/00* (2013.01)

(58) Field of Classification Search
CPC .... G06F 16/5838; G06F 17/30; G06F 9/6267; G06K 9/46; G06K 9/52
(Continued)

(56) References Cited

U.S. PATENT DOCUMENTS 6,396,963 B2 5/2002 Shaffer et al.
6,742,809 B2 6/2004 Frosig et al.
(Continued)

FOREIGN PATENT DOCUMENTS

| EP | 2312462 | 4/2011 |
|---|---|---|
| EP | 2443569 | 4/2012 |
| WO | 2011/154031 | 12/2011 |

OTHER PUBLICATIONS

USPTO, First Action Interview, Office Action Summary for U.S. Appl. No. 13/894,341, dated Sep. 2, 2014, 5 pages.
(Continued)

*Primary Examiner* — Isaac M Woo
(74) *Attorney, Agent, or Firm* — IP Spring

(57) ABSTRACT

Implementations generally relate to ranking and selecting images for display from a set of images. In some implementations, a computer-implemented method includes providing selected images for display, including examining characteristics of a plurality of images, where the examined characteristics include two or more of: visual capture characteristics, visual content characteristics, and social popularity characteristics of the images. The method determines individual scores for the respective examined characteristics of the images, determines overall scores of the images based on a combination of the individual scores for the examined characteristics of the images, and determines a ranking of the images based on the overall scores. The method selects one or more images based on the ranking of the images, and causes a display of the one or more selected images.

20 Claims, 5 Drawing Sheets

Related U.S. Application Data

(60) Provisional application No. 62/016,472, filed on Jun. 24, 2014.

(51) Int. Cl.
  *G06K 9/52* (2006.01)
  *G06K 9/62* (2006.01)
  *G06K 9/46* (2006.01)
  *G06Q 10/00* (2012.01)

(58) Field of Classification Search
  USPC .................................................. 707/600–899
  See application file for complete search history.

(56) References Cited

U.S. PATENT DOCUMENTS

| | | | |
|---|---|---|---|
| 6,847,733 B2 | 1/2005 | Savakis et al. | |
| 7,148,990 B2 | 12/2006 | Atkins et al. | |
| 7,403,642 B2 | 7/2008 | Zhang et al. | |
| 7,467,222 B2 | 7/2008 | Zhang et al. | |
| 7,508,961 B2 | 3/2009 | Chen et al. | |
| 7,519,200 B2 | 4/2009 | Gokturk et al. | |
| 7,587,070 B2 | 9/2009 | Myers et al. | |
| 7,737,995 B2 | 6/2010 | Vronay et al. | |
| 7,809,197 B2 | 10/2010 | Fedorovskaya et al. | |
| 7,856,380 B1 | 12/2010 | Latin-Stoermer et al. | |
| 7,860,319 B2 | 12/2010 | Obrador et al. | |
| 7,869,658 B2 | 1/2011 | Blose et al. | |
| 7,929,733 B1 | 4/2011 | Lehnert et al. | |
| 8,031,914 B2 | 10/2011 | Zhang | |
| 8,189,880 B2 | 5/2012 | Wen et al. | |
| 8,352,465 B1 | 1/2013 | Jing | |
| 8,352,494 B1 | 1/2013 | Badoiu | |
| 8,438,163 B1 | 5/2013 | Li et al. | |
| 8,566,331 B1 | 10/2013 | Covell et al. | |
| 8,571,331 B2 | 10/2013 | Cifarelli | |
| 8,626,699 B2 | 1/2014 | Xie et al. | |
| 8,660,358 B1 | 2/2014 | Bergboer et al. | |
| 8,724,910 B1 | 5/2014 | Pillai et al. | |
| 8,891,883 B2 | 11/2014 | Murphy-Chutorian et al. | |
| 8,983,193 B1 | 3/2015 | Ordonez Roman et al. | |
| 2001/0046330 A1 | 11/2001 | Shaffer et al. | |
| 2002/0191861 A1 | 12/2002 | Cheatle | |
| 2004/0016122 A1 | 1/2004 | Yamazoe | |
| 2004/0161224 A1 | 8/2004 | Yamazoe et al. | |
| 2006/0015494 A1 | 1/2006 | Keating et al. | |
| 2006/0020597 A1 | 1/2006 | Keating et al. | |
| 2006/0129555 A1 | 6/2006 | Burdick et al. | |
| 2006/0153460 A1 | 7/2006 | Kim et al. | |
| 2006/0198559 A1 | 9/2006 | Manico et al. | |
| 2006/0200475 A1 | 9/2006 | Das et al. | |
| 2006/0251338 A1 | 11/2006 | Gokturk et al. | |
| 2007/0177805 A1 | 8/2007 | Gallagher | |
| 2007/0209025 A1 | 9/2007 | Jing et al. | |
| 2008/0094420 A1 | 4/2008 | Geigel et al. | |
| 2008/0152201 A1 | 6/2008 | Zhang et al. | |
| 2008/0167102 A1 | 7/2008 | Diakopoulos et al. | |
| 2008/0212851 A1 | 9/2008 | Ray | |
| 2008/0267458 A1 | 10/2008 | Laganiere et al. | |
| 2008/0298766 A1 | 12/2008 | Wen et al. | |
| 2009/0034805 A1 | 2/2009 | Perlmutter et al. | |
| 2009/0113350 A1 | 4/2009 | Hibino et al. | |
| 2009/0252383 A1 | 10/2009 | Adam et al. | |
| 2009/0299999 A1 | 12/2009 | Loui et al. | |
| 2009/0300473 A1 | 12/2009 | Adams et al. | |
| 2010/0235400 A1 | 9/2010 | Myers et al. | |
| 2010/0303342 A1 | 12/2010 | Berg et al. | |
| 2010/0315522 A1 | 12/2010 | Tsurumi | |
| 2011/0194761 A1 | 8/2011 | Wang et al. | |
| 2011/0264641 A1 | 10/2011 | Yang et al. | |
| 2012/0106859 A1 | 5/2012 | Cheatle | |
| 2012/0155765 A1 | 6/2012 | Joshi et al. | |
| 2012/0275714 A1 | 11/2012 | Gao | |
| 2013/0050744 A1* | 2/2013 | Cok | H04N 1/00167 358/1.15 |
| 2013/0101220 A1 | 4/2013 | Bosworth et al. | |
| 2013/0148864 A1 | 6/2013 | Dolson et al. | |
| 2013/0190600 A1 | 7/2013 | Gupta et al. | |
| 2013/0215275 A1 | 8/2013 | Berini et al. | |
| 2013/0273968 A1 | 10/2013 | Rhoads et al. | |
| 2014/0153832 A1 | 6/2014 | Kwatra et al. | |

OTHER PUBLICATIONS

EPO, International Search Report and Written Opinion for International Patent Application No. PCT/US2015/037231, dated Aug. 24, 2015, 11 pages.

USPTO, Notice of Allowance for U.S. Appl. No. 13/489,407, dated Jul. 10, 2014, 13 pages.

USPTO, Non-final Office Action for U.S. Appl. No. 13/489,407, dated Feb. 27, 2014, 15 pages.

USPTO, First Action Interview, Pre-Interview Communication for U.S. Appl. No. 13/894,341, dated May 28, 2014, 4 pages.

USPTO, Notice of Allowance for U.S. Appl. No. 13/894,341, dated Jan. 7, 2015, 7 pages.

"Photographer and Image Ranking Explained", pixabay. www. pixabay.com, May 29, 2012, 4 pages.

International Bureau of WIPO, International Preliminary Report on Patentability for International Patent Application No. PCT/US2014/037895, dated Jan. 12, 2016, 7 pages.

International Bureau of WIPO, International Preliminary Report on Patentability for International Patent Application No. PCT/US2015/037231, dated Dec. 27, 2016, 8 pages.

San Pedro, et al., "Leveraging User Comments for Aesthetic Aware Image Search Reranking," WWW 2012. Session: Obtaining and Leveraging User Comments, Apr. 16-20, 2012, 439-448.

San Pedro, et al., "Ranking and Classifying Attractiveness of Photos in Folksonomies," WWW 2009. Session: Photos and Web 2.0, Apr. 20-24, 2009, 771-780.

Trevisiol, et al., "Image Ranking Based on User Browsing Behavior," SIGIR '12, Aug. 12-16, 2012, 445-454.

USPTO, Non-final Office Action for U.S. Appl. No. 14/747,079, dated May 26, 2017, 10 pages.

USPTO, Notice of Allowance for U.S. Appl. No. 14/520,339, dated Dec. 18, 2015, 17 pages.

USPTO, International Search Report for International Patent Application No. PCT/US2014/037895, dated Dec. 21, 2015, 2 pages.

USPTO, First Action Interview, Pre-Interview Communication for U.S. Appl. No. 14/520,339, dated Oct. 7, 2015, 2 pages.

USPTO, Notice of Allowance for U.S. Appl. No. 14/747,079, dated Sep. 1, 2017, 5 pages.

USPTO, Written Opinion for International Patent Application No. PCT/US2014/037895, dated Dec. 21, 2015, 6 pages.

USPTO, Notice of Allowance for U.S. Appl. No. 13/894,341, dated Oct. 23, 2015, 9 pages.

First Office Action mailed for Chinese Patent Application No. 201480035729.0, dated Jan 9, 2019, 18 Pages.

* cited by examiner

RANKING AND SELECTING IMAGES FOR DISPLAY FROM A SET OF IMAGES

CROSS REFERENCE TO RELATED APPLICATIONS

The present application is a continuation of U.S. patent application Ser. No. 14/747,079, filed Jun. 23, 2015 and titled RANKING AND SELECTING IMAGES FOR DISPLAY FROM A SET OF IMAGES, which claims priority to U.S. Provisional Application No. 62/016,472, filed Jun. 24, 2014 and titled RANKING AND SELECTING HIGH-QUALITY IMAGES, the contents of both of which are incorporated herein by reference in their entirety.

BACKGROUND

The popularity and convenience of digital cameras as well as the widespread of use of Internet communications have caused user-produced images such as photographs to become ubiquitous. For example, users of Internet platforms and services such as email, forums, photograph repositories, and network services post images for themselves and others to view. Thousands of images can be posted by users to a network service for private viewing (e.g., friends or other small groups of users) and/or public viewing by many users.

SUMMARY

Implementations generally relate to ranking and selecting images for display from a set of images. In some implementations, a computer-implemented method includes providing selected images for display, including examining characteristics of a plurality of images, where the examined characteristics include two or more of: visual capture characteristics, visual content characteristics, and social popularity characteristics of the images. The method determines individual scores for the respective examined characteristics of the images, determines overall scores of the images based on a combination of the individual scores for the examined characteristics of the images, and determines a ranking of the images based on the overall scores. The method selects one or more images based on the ranking of the images, and causes a display of the one or more selected images.

Various implementations and examples of the method are described. For example, the method can further include, prior to the examining characteristics, selecting the plurality of images as a subset of candidate images from a set of images based on an initial set of characteristics of the set of images. For example, the initial set of characteristics of the set of images can be processed using less computational resources than the examined one or more characteristics of the subset of candidate images. The display can be a public display of the one or more selected images over one or more networks, where the initial set of characteristics can include a privacy characteristic indicating whether an associated image is allowed by an associated user to be displayed publicly, and selecting the plurality of images as a subset can include excluding one or more images having a privacy characteristic indicative of a restriction on public display of the one or more images. In some examples, the initial set of characteristics can include a resolution of an associated image, and/or noise detected in an associated image. The set of images can be provided by a plurality of different users. Determining a subset of candidate images can include detecting one or more faces depicted in the set of images, where images depicting the one or more faces can be excluded from the subset of candidate images.

One or more of the examined characteristics can each include a plurality of types of the examined characteristic, where determining individual scores for the respective examined characteristics of the images can include weighting each of the types of the examined characteristic by a different amount, and combining the weighted types to determine the individual score of the examined characteristic. For example, a plurality of the individual scores can each be weighted by a different amount in the determining of the overall scores.

Examining social popularity characteristics can include retrieving the social popularity characteristics for the image from a network service, wherein the social popularity characteristics can include a number of views of each of the plurality of images by one or more users of a network service, a number of user comments for each of the plurality of images, a share count for each of the plurality of images, and/or a rating count for each of the plurality of images. In some implementations, one or more users contributing input to the network service to create the social popularity characteristics can be checked for an associated reputation score indicating a weight of input from the one or more users, where the reputation score can be based on past history of input activity to the network service from the one or more users, and the determining of the individual scores can include weighting the social popularity characteristics based on the reputation score.

The visual content characteristics can include one or more types of content features depicted in the images, wherein the images are assigned one or more individual scores based on one or more detected types of content features depicted in the images. The one or more types of content can include faces, landmarks, landscape features, and objects, for example. Examining the one or more visual content characteristics can include comparing the detected types of content features depicted in the image to a predetermined list of one or more undesirable recognized content types, where the predetermined list includes a content type that includes human faces, and excluding from selection one or more of the plurality of images depicting at least one type of content feature matching one or more recognized content items in the predetermined list. The visual capture characteristics can include blurriness of the plurality of images and/or exposure level of the plurality of images.

In some implementations, a system to provide selected images for display includes a storage device and at least one processor operative to access the storage device and configured to determine characteristics for an image, where the characteristics include two or more of: visual capture characteristics, visual content characteristics, and social popularity characteristics of the image. The processor is configured to generate one or more individual scores for the respective one or more characteristics of the image, combine the one or more individual scores to determine an overall score of the image, determine that the overall score satisfies a predetermined display requirement, and provide a display of the image. Various implementations and examples of the system are described. For example, the processor can be further configured to determine a ranking of the image with respect to one or more other images based on the overall score of the image. The processor can be further configured to assign a weight to each of the one or more characteristics and determine the one or more individual scores based on the one or more weighted characteristics, and assign a weight to each of the one or more individual scores and determine the overall score of the image based on the one or more weighted individual scores.

In some implementations, a computer readable medium can have stored thereon instructions that, when executed by a processor, cause the processor to determine a subset of candidate images from a plurality of images based on an initial set of characteristics of the plurality of images. The instructions cause the processor to examine characteristics of the subset of candidate images including two or more of: visual capture characteristics, visual content characteristics, and social popularity characteristics of the images. The instructions cause the processor to determine overall scores of the candidate images based on the examined characteristics of the candidate images, determine a ranking of a plurality of the candidate images based on the overall scores, select one or more highest ranking candidate images of the ranked candidate images, and provide a display of the selected one or more highest ranking candidate images. In some implementations, the instructions can further cause the processor to determine an individual score for each of the characteristics for each of the candidate images, assign a weight to each of the individual scores, and combine the individual scores for each candidate image to determine the overall scores of the candidate images.

DETAILED DESCRIPTION

Figure 1:
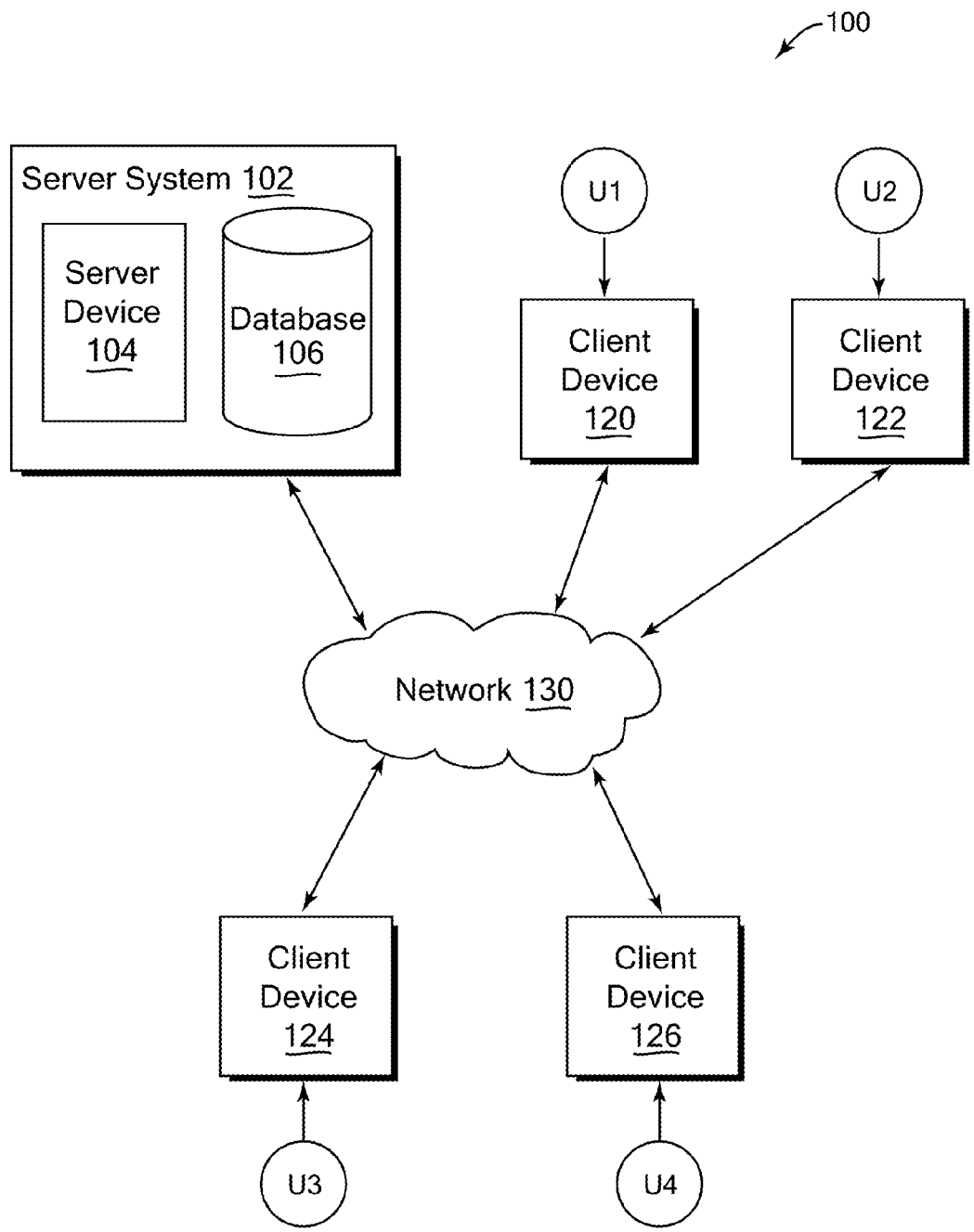
FIG. 1 is a block diagram of an example network environment which may be used for one or more implementations described herein.

One or more implementations described herein relate to ranking and selecting images for display from a set of images. In some examples, a system can automatically rank large numbers of images based on particular image characteristics and select ranked images for featured display. In some implementations, a system can examine image characteristics including visual capture characteristics, social popularity characteristics, and/or visual content characteristics of the images. Some implementations can assign individual scores to the characteristics for an image, and can assign an overall score to the image based on the individual scores. A ranking of images can be based on the overall scores of the images, and a display of one or more of the images can be based on the ranking.

In some examples, a subset of images can be initially selected to examine for the ranking and selecting, where the subset is obtained from a larger set of images, e.g., provided by different users. For example, the subset of images can be selected based on an initial set of characteristics of the images, where images that do not meet requirements of the initial set of characteristics can be excluded from the subset and thus excluded from selection for display. In some implementations, the initial set of characteristics can be processed using less computational resources than other image characteristics examined by the method. For example, the initial set of characteristics can include a privacy characteristic indicating whether an associated image is allowed by an associated user to be displayed publicly, a resolution of the associated image, and/or noise detected in the associated image. Some implementations can examine image content characteristics as an initial characteristic, e.g., examining to detect faces in the associated image, where images depicting one or more faces can be excluded from the subset of images.

Some example implementations can examine multiple types of one or more of the examined characteristics, where one or more types of an examined characteristic can be weighted by a different amount and combined to determine an individual score for that characteristic. The individual scores of the characteristics can be weighted by different amounts in determining the overall score for an image. In some examples, the social popularity characteristics can include number of views, number of user comments, a share count, and/or a rating count of the image. Some social popularity characteristics can be weighted based on reputation scores of users contributing social data to the image. Visual content characteristics can include different types that influence the individual scores, e.g., faces, landmarks, landscape features, objects, etc. Some predetermined content types, if detected in an image, can cause the image to be excluded from being selected and ranked. The visual capture characteristics can include blurriness, exposure level, etc.

These and other described features can allow images to be ranked, selected, displayed, and featured based on characteristics of the images. For example, described features allow a large collection of images from multiple users to be ranked so that the "best" images having high overall quality, as determined based on multiple image characteristics, can be reliably and automatically selected, displayed, and/or showcased. For example, one or more described features can be used by a network service such as a web site photo collection service, an image distribution service, social networking service, etc. to display images selected from various images provided by users to the network service. Images of high overall quality can be consistently determined using one or more described features, e.g., by examining and scoring a combination of various classes of image characteristics, such as social popularity characteristics, visual capture characteristics, visual content characteristics, etc. In addition, some implementations can initially process a set of images to find a subset of candidate images, and the subset of candidate images is then ranked and images are selected for display from the subset. For example, examining the initial characteristics of the image can require less processing resources than examining characteristics for ranking the images.

A system using one or more features described herein can select images for display having the highest general appeal from a set of images. In some implementations, one or more described features can reduce the processing resources needed to select and display such images. For example, described features can automatically obtain high quality and consistency in selected images without requiring persons to manual review or curate a large set of images to rank and select the images based on visual characteristics. The system can reduce user time and effort by avoiding tedious manual examination and selection of images to find high quality images to feature in displays. Furthermore, described features can efficiently examine and rank large numbers of images, thus reducing the processing resources needed for ranking and selection of high quality images from a large set of images.

An "image" as referred to herein can be a still image, single image, or standalone image, or can be an image included in a series of images, e.g., a frame in a video sequence of video frames, or an image in a different type of sequence of images. For example, implementations described herein can be used with single images or with one or more images from one or more series or video sequences of images. The overall quality of an image can refer to its general appeal to users with respect to a number of characteristics, including technical visual appearance (e.g., based on blurriness, exposure level, brightness, etc.), its depicted subjects (e.g., approved or generally desired content types depicted in the image), and its social popularity (e.g., the number of users that like the image, the number of favorable ratings, comments, shares, and/or reviews of the image from users who have viewed the image, etc.).

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service, implemented on server system 102. For example, respective client devices 120, 122, 124, and 126 may communications data to and from one or more server systems (e.g., system 102). In some implementations, the server system 102 may provide appropriate data to the client devices such that each client device can receive communicated content or shared content uploaded to the server system 102 and/or network service. In some examples, users U1-U4 can interact via audio or video conferencing, audio, video, or text chat, or other communication modes or applications. A network service implemented by server system 102 can include a system allowing users to perform a variety of communications, form links and associations, upload and post shared content such as images, text, video, audio, and other types of content, and/or perform other socially-related functions. For example, users can view content such as images sent or streamed to their client devices originating from a different client device via a server and/or network service, or originating from a server system and/or network service. In some implementations, a "user" can include one or more programs or virtual entities, as well as persons that interface with the system or network.

A user interface can enable display of images, video, data, and other content as well as communications, privacy settings, notifications, and other data on a client device 120, 122, 124, and 126. Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide an image display program. The image display program may allow a system (e.g., client device or server system) to provide options for displaying an image, some examples of which are described herein. The image display program can provide an associated user interface that is displayed on a display device associated with the server system or client device. The user interface may provide various options to a user to select editing options, display modes, etc. In some examples, the display program can provide different display modes to display selected and ranked images, e.g., based on ranking, for predetermined periods of time, based on user input, etc.

Other implementations of features described herein can use any type of system and/or service. For example, photo collection services or other networked services (e.g., connected to the Internet) can be used instead of or in addition to a social networking service. Any type of electronic device can make use of features described herein. Some implementations can provide features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2:
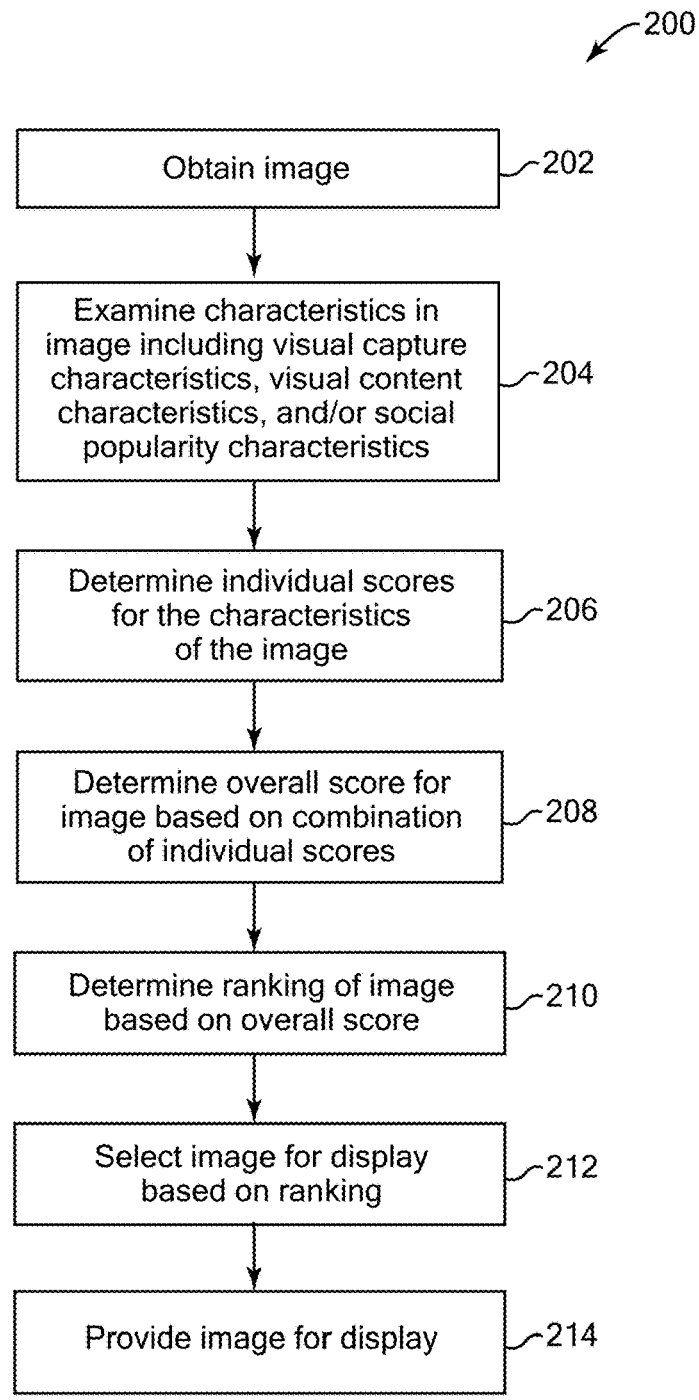
FIG. 2 is a flow diagram illustrating an example method for ranking and selecting images for display from a set of images, according to some implementations.

FIG. 2 is a flow diagram illustrating one example of a method 200 to rank, select, and provide images for display from a set of images. In some implementations, method 200 can be implemented, for example, on a server system 102 as shown in FIG. 1. In other implementations, some or all of the method 200 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 200.

In some implementations, the method 200, or portions of the method, can be initiated automatically by a system. For example, the method (or portions thereof) can be periodically performed, or performed based on one or more particular events or conditions, e.g., an application being opened by a user, receiving one or more original images that have been newly uploaded to or accessible by the system, a predetermined time period having expired since the last performance of method 200, and/or one or more other conditions occurring which can be specified in settings of a system. In some implementations, such conditions can be specified by a user in stored custom preferences of the user. In one example, a server system can receive one or more images uploaded from one or more users, and can perform the method 200 for the newly-uploaded images. In another example, a system (server or client) can perform the method 200 for a large collection of accessible images. In another example, a camera, cell phone, tablet computer, wearable device, or other client device can capture an image and can perform the method 200. In addition or alternatively, a client device can send a captured image to a server over a network, and the server can process the image using method 200. Some implementations can initiate method 200 based on user input. A user (e.g., operator or end-user) may, for example, have selected the initiation of the method 200 from a displayed user interface, e.g., a social networking user interface, application user interface, or other user interface. In some implementations, method 200 or portions thereof can be performed with guidance by the user. For example, a user can designate a set of multiple input images to be processed by method 200.

In block 202 of method 200, the method obtains an image for processing. The image can be a digital image composed of multiple pixels, for example, and can be stored on one or more storage devices of the system or otherwise accessible to the system, e.g., a connected storage device such as a local storage device, storage device connected to or in communication with a network accessible to the system, etc. For example, the image can be a photo captured by a camera, an image frame extracted from a captured video stream or other video data, or an image derived from a different source. In various implementations, the image can be automatically obtained by the method, e.g., as an image from a stored collection of multiple images, e.g., from a user's album, a pool of stored images submitted by all users, etc. The collection can be locally stored and accessible by the device performing method 200, and/or can be remotely stored on a server or client device, e.g., as one or more albums provided in account(s) of user(s) of a network service. In some implementations, the system can determine which image to select based on evaluating one or more characteristics of accessible images, e.g., timestamps and other metadata of images, the color distributions of images, the recognized content or labels describing content in images, etc. In some implementations, a user (e.g., system operator) can provide, select, or designate one or more images to obtain for processing.

In block 204, the method examines characteristics of the obtained image. These characteristics can include a wide variety of different image characteristics. In some implementations, these characteristics can include multiple different classes (e.g., categories) of image characteristics, including visual capture characteristics related to the visual appearance of the image and its capture by a camera or similar device, visual content characteristics related to content depicted in the image (e.g., persons, animals, objects, landscape features or areas, environments, etc.), and/or social popularity characteristics related to the popularity and opinion of the image among persons or users of one or more systems. In some examples, various implementations can examine all three of these classes of characteristics, two of these classes of characteristics, one of these classes of characteristics (and/or other classes), etc. In some implementations, certain classes of characteristics can be evaluated before other classes, e.g., to make the evaluation process more efficient with regard to processing time, storage, and/or other computing resources. Some example implementations are described in greater detail with respect to FIG. 3.

In block 206, the method determines individual scores for the examined characteristics of the obtained image. An individual score is an estimated measurement (e.g., value) for a characteristic as specified in a predetermined scale and indicating a rating for that characteristic, e.g., a magnitude of the strength or degree of presence of that characteristic in the image, a value indicating a degree that the characteristic deviates from an established baseline, etc. An individual score can be determined based on one or more factors or inputs related to the image that the method examines. In various implementations, the method can determine an individual score for each characteristic of the image (or class of characteristic) examined in block 204. In some implementations, an individual score can be determined for each of multiple types of characteristics within each of these classes of characteristics. For example, visual content characteristics can include facial content characteristics and landmark content characteristics, and a first individual score can be determined for facial visual content and a second individual score can be determined for landmark visual content. In some implementations, an individual score can be a combined individual score that is a combination (e.g., sum, average, mean, etc.) of multiple individual scores determined for the multiple types of characteristics within a characteristic class. For example, a first individual score can be determined for the class of visual capture characteristics, a second individual score can be determined for the class of visual content characteristics, and a third individual score can be determined for the class of social popularity characteristics. In another example, a visual content individual score can be a combination of the facial content individual score and the landmark content individual score. Some implementations can weight some types or classes of individual scores differently than other types or classes, e.g., to adjust the influence of different types and/or classes of characteristics to a combined individual score. Some examples of individual scores are described in greater detail below with respect to FIG. 3.

In block 208, the method determines an overall score for the image based on a combination of the individual scores determined in block 206. In some examples, the combination can be a summation, average, mean, or other combination of the individual scores. In some implementations, the method can assign weights to individual scores of different characteristics to increase or decrease the influence of those characteristics to the overall score. In some implementations, the weights can be based on previous actual observations by persons of the amount of influence of particular characteristics to the evaluation of visual appearance of images by users in general. For example, previous observations by persons may have determined that social popularity has a more significant influence on perception of an image than does capture characteristics, such that social popularity characteristics are weighted higher in determining the overall score. Some implementations can use machine learning or training of the method 200 to combine the individual scores into an overall score. Some examples of determining an overall score are described in greater detail below with respect to FIG. 3.

In block 210, the method determines a rank of the obtained image based on the overall score determined in block 208. In some implementations, the rank can be determined by comparing the overall score to the image to overall scores associated with other images that the method has examined and ranked. In one example, the obtained image is placed in a single ranked order of images such that the overall scores of the images numerically increase (or decrease) when traversing the list. The other images can be any set of images. For example, the other images can be images owned by or accessible to a user who also owns or can access the obtained image, or images of one or more other users, e.g., stored by an image collection or distribution service, social networking service, or other service accessible over a network by the system processing the obtained image. The ranking of the images can provide a list of images ranked according to their overall quality, e.g., general visual appeal based on the characteristics described above such as visual capture characteristics, visual content characteristics, and social popularity characteristics.

In block 212, the method determines that the image satisfies one or more display requirements and selects the image for display. For example, the method can determine that the rank of the image (determined in block 210) satisfies a rank threshold, which qualifies the image for display. In some examples, the image can satisfy the rank threshold by having a rank that is equal to or greater than the rank threshold, such that images having a sufficiently high rank are suitable for display. In some examples, other display requirements can also or alternatively be used, such as the overall score of the image meeting an overall score threshold (e.g., the image overall score is higher than the threshold overall score), and/or one or more individual score thresholds for the characteristics of the image as described above meeting individual score thresholds. In some implementations, the method selects one or more other ranked images in addition to the image. For example, in some implementations the method can use the ranking (and/or other display requirements) to select one or more images from a set of images in a user's particular collection of images.

In block 214, the method causes a display of the selected image(s), e.g., provides the selected image for display. For example, the method can provide the image to a display device of a server device or client device. In some implementations, the method can provide the image to a system that sends the image, e.g., over one or more networks, to be displayed by display devices of one or more server devices and/or client devices. In some examples, the image is provided for "featured display," e.g., public display to users as featured images. In some implementations, one or more of the other images which have been ranked can be provided for featured display along with the image. For example, a photo or image collection service, social networking service, or other networked service can provide selected images as one or more featured images to feature or showcase on the networking site. In some implementations, these features images are the highest ranking images indicating the most generally appealing images of a set of images submitted and/or published on the site or service. For example, the featured images may be displayable and viewable to all users of the site or viewable by a particular designated subset of users. For example, the selected image(s) can be displayed on a front page or main page of a website, service user interface, or other public display of information. In another example, the selected image(s) can be displayed by one or more devices during idle times of the devices, e.g., after a predetermined period of time in which no applicable user input has been received or other conditions have occurred. For example, the selected images can be displayed by a client or server device as "screen saver" images, background ("wallpaper") images for a displayed user interface, etc.

In some cases or implementations, implementing system(s) can maintain multiple different ranked lists of images, where each list includes images having one or more different characteristics than the other lists. For example, different ranked lists can be maintained for different types of content depicted in the examined images (e.g., a ranked list for images showing animals, a ranked list for images showing landscape features, etc.). In some implementations, an image can be placed in multiple such ranked lists if it qualifies by depicting multiple types of content. In other implementations, an image can be placed in only one ranked list based on its more prominent or emphasized type of content, e.g., as determined by the size, position, or other characteristics of recognized content features. For example, a recognized animal feature in an image may be larger than a recognized landmark in the image, and the animal feature is centrally positioned in the image, such that the image is placed only in the animal ranked list. In some examples, a networked service can rank images to feature and display on the service in different particular categories or types of image content. In some additional examples, a system can maintain different ranked lists based on different types or values of characteristics such as image size and/or resolution, overall brightness, contrast, or other visual capture characteristics, degree of social popularity (e.g., based on individual scores for social popularity characteristics), etc.

Some examples of details and features that can be used in method 200 are described below with reference to FIG. 3.

Figure 3:
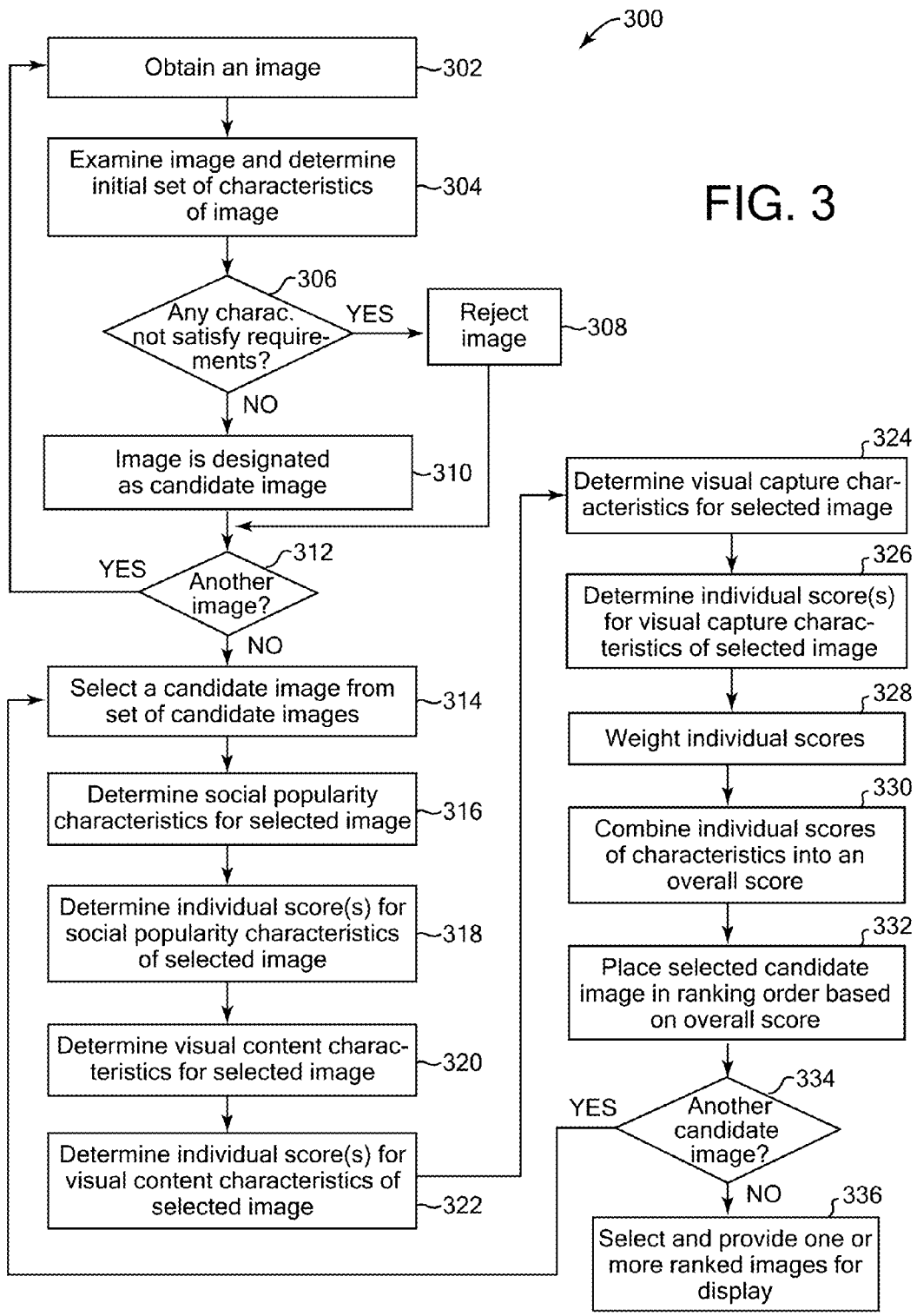
FIG. 3 is a flow diagram illustrating another example method for ranking and selecting images for display from a set of images, according to some implementations.

FIG. 3 is a flow diagram illustrating an example method 300 to rank, select, and provide images for display from a set of images. Method 300 can be implemented by a system that is or includes, for example, a server and/or client device, and can be similarly initiated and performed, as described above for method 200.

In block 302, the method obtains an image, e.g., similarly as described above for block 202 of FIG. 2. In some implementations, the obtained image can be an image that has not previously been examined and ranked by the method 300. In some example implementations, the image can be obtained from a set of images that have been submitted by one or more users to a networked service or site since the last evaluation of submitted images was performed by method 300. In some implementations, the obtained image may have been previously examined and ranked. For example, a user associated with the image may have edited the image (e.g., changed a pixel value of one or more pixels of the image), thereby causing it to be re-examined and re-ranked by method 300. In another example, a predefined time period may have passed to cause previously examined and ranked images to be re-examined and/or ranked by method 300.

In block 304, the method examines the obtained image and determines or detects an initial set of characteristics of the obtained image. In some implementations, the initial set of characteristics are characteristics that require less computational resources (e.g., less computational intensity) to detect and determine in an image as compared to other types of image characteristics which may be examined and determined later in method 300 as described below. For example, the computational resources can include processing time and/or system resources, e.g., memory or other storage space, hardware and software processing/computing resources, etc. For example, in some cases, examining the initial set of characteristics can allow the method to exclude from selection an image (e.g., as described in block 306) based on the examination of the initial set of characteristics, which may allow the method to omit performing an examination of other types (and/or classes) of image characteristics for that image. In some implementations, this may allow an overall reduction in use of system resources and/or a reduction in time of processing by method 300.

The initial set of characteristics can include a variety of types of characteristics.

In some implementations, the initial set of characteristics can include a privacy characteristic, e.g., whether the obtained image has a public or private status. A private status can allow distribution of the image to only a subset of users of a system or service, and not all users. For example, a private status can cause an image to be shareable, viewable, and/or accessible only to a specified set of other users. For example, the specified set of other users can be users who are members of designated user groups of a social networking service or other networking service. A public status, in contrast, can allow the image content to be viewable and/or otherwise accessible to any user of a social networking service or other service. In some implementations, an image can be considered to have a public status if it is eligible to be viewed by any user of a service, even if the user may not currently be able to view the image. For example, images provided in a public group may not be viewable by a user unless the user joins the public group, but since any user of the service is eligible to join the public group, the images can be considered to be public. In some implementations, the privacy status of an image can be designated explicitly in metadata or other data associated with an image, or the privacy status can be inferred by other image data or associated data (or lack thereof), predefined preferences or settings, etc. For example, in some systems or services, images depicting a person's face may default to being considered private status.

Another example of an initial characteristic is a size of the image. For example, the resolution of the image can be determined, e.g., specified as height and width dimensions of the image in number of pixels or in another format. Another example of an initial characteristic is a noise measurement of the image. For example, one or more noise detection and measurement techniques can be used to evaluate the color noise and/or other types of noise present in the image. In one example, color noise (e.g., chromatic noise) is unintended or undesired variation or changes in color values of pixels of an image and can be caused by, for example, lighting conditions under which images are captured by a camera (e.g., underexposed photographs), performance of camera components, image processing software or image conversions, and/or various other causes.

Another example of an initial characteristic is particular types of content depicted in the image. For example, the method can check for the presence of any of the particular types of content as determined by image recognition techniques or other image content analysis techniques. In one example, one particular type of content can be human faces, where one or more facial recognition techniques can be used to look for known patterns of facial landmarks such as eyes, eyebrows, mouth, etc. to detect faces. Some techniques can look for known skin tones in pixels, etc. In some implementations, the identity of the person whose face is detected (e.g., name of the person or user, etc.) need not be determined in this block, and the detection of one or more human faces can be performed without regard to the face's identity. In some implementations, various other types of image characteristics can be used as initial characteristics. For example, any of the other types of characteristics described below can be examined as initial characteristics in block 304.

In block 306, the method checks whether any of the initial characteristics examined in block 304 do not satisfy one or more predetermined requirements. In some implementations, some or all of the predetermined requirements can be based on one or more characteristics of images that are considered desirable to the implementing system or service, e.g., which image characteristics can cause an image to be selected for display. In some implementations, some or all of the predetermined requirements can be based on one or more characteristics of images that are considered undesirable, e.g., which image characteristics can cause an image to be eliminated from the possibility of selection and display if the required characteristics are present. For example, images that do not satisfy the requirements can be considered undesirable as described below.

In one example, an example initial characteristic can be a privacy characteristic as described above. The privacy characteristic of the image can be associated with a requirement that the image have a public status privacy characteristic. This causes undesirable images to be images that have been designated or considered private status, e.g., by the owning or controlling users of those images or as a default status. In some implementations, by having a requirement of a public status, the method may reduce potential issues related to publishing the image as a featured image on a web site or network service. In another example, a requirement for a size characteristic of the image can require that the image have a particular resolution (or other specified size) or larger, such that smaller-resolution images (e.g., having a resolution under a resolution threshold) do not meet the requirement. This requirement causes desirable images to have a predetermined minimum size and eliminates smaller images from the possibility of being displayed. In another example, a requirement for a noise characteristic of the image can require that the image have less than a threshold amount of noise, such that noisier images (e.g., having noise over the noise threshold) do not meet the requirement. This causes desirable images to have a maximum amount of noise that is considered acceptable and eliminates noiser images from the possibility of being displayed.

In another example, a visual content characteristic can be included in the initial characteristics, where one or more requirements of particular visual content can be used to eliminate undesirable content depicted in the image. For example, in some implementations a visual content requirement can cause the method to check for predefined undesirable types of content depicted in the image. If one or more undesirable types of content are found in the image, the image can be disqualified from selection and display. In one example, a networked service such as a photo collection site or a social networking service may desire to feature or showcase visually appealing images, but may not wish for any of the featured images to depict faces. This may be the case, for example, to avoid publishing and featuring images showing specific identities for privacy reasons and/or to showcase or feature images that are more generally useful to users, e.g., as wallpaper, for their own websites, etc. (which typically would not depict faces of people not personally known to the users). Other types of content may also not meet the requirements, such as particular types of objects, landscapes, animals, etc.

Thus, in block 306, the method checks whether any of the initial characteristics of the image do not satisfy the requirements associated with those initial characteristics. If any of the characteristics do not meet their requirements, then in block 308 the method rejects the selected image so that the image is removed from further analysis for determining its rank. For example, this can include associating and storing particular metadata (e.g., a flag, value, or other designation) with the rejected image indicating that it is rejected and not a candidate image, e.g., suitable for deletion of the image from storage used by the method 300, and/or other rejected status. In some implementations, rejected images are not ranked. In some implementations, a rejected image can remain to be processed and be assigned an indication to assign it a particular rank (e.g., in block 332). For example, the rejected image can be automatically assigned a low rank value regardless of its other examined characteristics, e.g., the lowest possible rank value which may ensure that the image is not selected for display. In other implementations, metadata or other information indicating that the image was rejected can be used for other purposes, e.g., storing rejected images in a list or sending rejected images to particular users or systems. The method then continues to block 312, described below.

For example, a requirement of particular types of visual content may have caused the method to detect an undesirable type of content depicted in the image that does not satisfy the requirement, e.g., human faces, undesired animals (e.g., insects, worms, or other animals having general negative reactions from users), etc. Since the visual content characteristic did not satisfy the associated requirement, the image is rejected and can be assigned a rejected status and/or an indication to assign the image a very low rank.

If the initial characteristics of the image meet their associated requirements in block 306, then in block 310 the method designates the obtained image as a candidate image. Candidate images are images that have met the initial requirements checked in block 306 and can be examined and ranked in later blocks, and potentially can be selected for display.

As described above, the method may reject and/or discard an image before having to perform additional processing for the image in method 300. If one or more images are rejected, the method may only need to perform the additional processing on a subset of the set of images to be processed. In some implementations, this feature can save processing resources including time and system resources (memory and other storage space, processor computing resources, etc.), and may allow increased savings in processing resources in implementations in which the method 300 processes a large number of images for rankings and selection, e.g., thousands or more images.

In block 312, the method checks whether there is another image to process for initial characteristics. For example, there may be a set of images to process by method 300 as described above. In one example, the set of images may have been uploaded to a system over a network, and the method 300 can examine one or more of those images. If there are more images, the process returns to block 302 to obtain another image. If there are no more images to examine, then the process continues to block 314. In other implementations, the method can both return to block 302 to obtain another image, as well as simultaneously continue to block 314 and block 316 to process a candidate image. In some implementations, the method can continue to block 314 only if there has been one or more new candidate images determined in one or more performances of block 310.

In block 314, the method selects a candidate image from a set of candidate images determined based on the previous blocks of method 300. In some implementations, block 314 can select the image that was processed in blocks 302-310 if that image was found to be a candidate image.

In block 316, the method may determine social popularity characteristics for the selected candidate image. These can be characteristics indicating the social popularity of the candidate image to users of one or more systems or network services based on social data provided by the users to the system or service with respect to the candidate image. In various implementations, the social popularity characteristics can include, for example, the number of users that have viewed the image, the number of times the image has been viewed by users, and/or the length of the times the image has been viewed by users. In some examples, the time length of viewing can be determined using timestamps stored for an image indicating the times when the image was first displayed for a user and when the image was closed or removed from display by the user.

The social characteristics can include a share count, e.g., the number of times that the image has been shared from a user to one or more other users. For example, sharing an image can occur between users of the same network service. In some implementations, an image can be shared between network services, or over other communication forms such as email, text messages, etc. In some implementations, the share count can includes "re-shares," e.g., sharing a previously-shared image, where, for example, a second user receives the image in a shared communication from a first user, and then the second user re-shares the image to a third user. Other implementations can exclude re-shares from the share count.

The social characteristics can include a rating count, e.g., the number of ratings given to or otherwise associated with the image by users indicating an opinion or recommendation of the image by those users. For example, the rating count can include the number of times that the image has been positively rated by one or more users of a network service, indicating approval or praise of the image by those users. In another example, the rating count can include the number of times that the image has been rated to indicate one or more particular opinions of the image, e.g., disapproval, approval, recommendation, indifference, etc. For example, a user's opinion of the image can be expressed in a binary form (e.g., approve or disapprove), or in a predetermined numerical scale and range, e.g., a value in a range from 1 to 5, 1 to 10, −5 to +5, etc. Other rating information can also be included in social popularity characteristics, such as the time elapsed between the occurrence of each rating of the image and the last rating of the image, the number of repeat ratings by the same users, etc.

The social popularity characteristics can include the number of times the image has been put on a users' favorite lists, bookmark lists, and/or other lists by users. The social popularity characteristics can include the number of comments about the image by users (e.g., whether positive or negative). For example, some network services can allow users of the network service to make online comments related directly to an posted image. In some implementations, the method can finding the number of positive comments and the number of negative comments for the image, e.g., by checking comments for predetermined words or phrases considered positive and negative, etc.

In some implementations, social data describing the social popularity characteristics can be available and obtained from one or more network services, databases, or other network sources. For example, a social networking service can track one or more of the social popularity characteristics for each image posted on the service, or for particular publicly-posted images. Likewise, other types of network services or sites can track and store such social popularity characteristics which can be available to method 300. In some implementations, some or all social data describing social popularity characteristics can be stored with the image, e.g., as image metadata. Some implementations can store social popularity characteristic data separately from the image and associated with the image, e.g., with one or more links allowing access to the data.

In block 318, the method may determine one or more individual scores for the social popularity characteristics determined in block 316. In some implementations, each examined type of social popularity characteristic (e.g., number of views, share count, rating count, etc.) can be assigned its own individual score, and these individual scores can be used in blocks 328 and 330 described below. Some implementations can determine an individual score as a combination individual score that includes contributions from all of the different types of social popularity characteristics determined in block 316, e.g., a combination of individual scores of the different types of social popularity characteristics. In some examples, the individual scores resulting from multiple different types of social popularity characteristics can be combined, e.g., using an average, sum, median, etc.

Some implementations can assign different weights to different types of social popularity characteristics. For example, some implementations can assign a more influential (e.g., higher) score weight to the share count of the image than to the number of times the image has been viewed. For example, a higher weighting of one social popularity characteristic can cause a higher contribution to a combined individual score for social popularity characteristics than if the social popularity characteristic were not weighted or lower-weighted.

In some implementations, the block 318 (or other connected process) can examine and/or score the social popularity characteristics based on data indicating a reliability or robustness of the social data, e.g., data indicating a reputation of one or more users who contributed the social data. In some implementations, a poor or low user reputation can cause social data contributed by the associated user to an image to be assigned a lower weight. For example, the social data for the image may include undesired data such as fake input from entities (e.g., users, organizations, or automated programs). The fake input can include, for example, fake positive comments from entities to boost the ratings or marketing of an image, advertisements or spam comments and ratings from particular entities wishing to advertise or sell items or services, social data provided by bots or other programs accessing, commenting, and rating images, etc. Such fake input can provide false indications that an image is more popular among users than it is in actuality.

In some implementations, the method can evaluate the social data associated with the candidate image to detect if any such fake data is likely to be present. In some implementations, for example, the users are evaluated who provided the social data from which one or more of the social popularity characteristics of the image are based. For example, the reputations of such users can be examined. User reputation data can be obtained or determined from social networking services, other network services, or other networked sites that can track user online activity to determine if particular users are providing fake or dishonest input. For example, the services can track the amount and repetition of comments, accesses, and ratings of users to attempt to categorize the user's input as suspicious, which causes an adjustment in the reputation of the user (e.g., toward a low or poor reputation). In one example, a short message or comment that is repeated from the same user but never shared by users to other users may be an indication that the comment could be an advertisement or spam, again causing an adjustment in that user's reputation. Some implementations can assign a reputation score to each user that can indicate the current reputation of the user, e.g., within a value range associated with poor to excellent reputation.

In some implementations, the social popularity characteristics that are associated with a poor user reputation can be reduced in their influence toward the associated individual score. For example, the social data relating to a user that has been found to have a low reputation can be reduced in weight or eliminated from consideration (e.g., disregarded) when determining the individual score for the related social popularity characteristics. For example, comments or ratings from a user with a low reputation can be reduced in weight or disregarded in the determination of the individual score(s) associated with these social popularity characteristics. In some examples, a reputation score that does not satisfy a reputation threshold (e.g., is below the reputation threshold) can cause the associated social data to be disregarded or adjusted in weight by a predetermined amount or an amount related to the magnitude of the reputation score. In some implementations, an individual score associated with social data having a low reputation can be adjusted directly based on the reputation score, e.g., the individual score can be reduced by a predetermined amount or an amount based on the magnitude of the reputation score.

In some implementations, a user's reputation can be used to increase the influence of the user's social data to the associated individual score(s), e.g., enhance or increase the weight of the user's social data. For example, social data associated with a user with a high reputation score can be given a higher weight than social data from users with average reputation scores. In some implementations, social data for an image contributed by an expert user known for evaluating images (e.g., professional photographer, art director, etc.) can be given a higher weight than social data from a non-expert user in some implementations, where the expert user may be assumed to have a more practiced sense of visual quality of images. An expert status of a contributing user can be determined, for example, based on data from a network service (e.g., user profile data describing user occupation, hobbies, etc.) or other source.

Some implementations can use user reputation data in other operations of the method 300. For example, the reputation of the user contributing the image to the examined images of blocks 304 and 306 can be an initial characteristic examined in block 304. If the reputation data indicates a reputation score that does not satisfy a predetermined threshold, then that image can be rejected in block 308 as described above.

In block 320, the method may determine visual content characteristics for the obtained image. For example, visual content characteristics can indicate types and other attributes of content features depicted in the image, including faces, objects, persons, animals, buildings, landmarks, landscape areas or regions, etc., referred to as "content" or "content features" herein. Content features can be detected and recognized in the image based on any of various known image recognition techniques, including facial recognition techniques, landmark recognition techniques (e.g., well-known landmarks), landscape recognition techniques (e.g., foliage, mountains, lakes, etc.), object recognition techniques (e.g., vehicles, buildings, articles, etc.). For example, image recognition techniques can examine the image for predetermined patterns, can compare portions of the image to reference patterns, can examine the image for image features such as facial landmarks (eyes, nose, mouth, etc.), text that can be recognized using text recognition techniques, particular colors at particular positions in the image (e.g., blue at top of image indicating sky), etc. Location data (e.g., metadata of images indicating a geographic location at which the image was captured or modified) can be used to assist recognition of particular types of content features such as landmarks, parks, businesses, etc.

In some implementations, visual content characteristics can include keywords or labels describing or related to recognized content. For example, keywords can describe content in various levels of detail or breadth, such as "vehicle" at a more general level and "car" at a more specific level, and both of these keywords may be associated with the image as a result of recognizing a car object in the image using image recognition techniques. In some implementations, some keywords or labels may be available using machine learning techniques (e.g., deep learning techniques) for image recognition of image features. In some implementations, keywords can specify identities of particular content features, such as a name of an identified person, a name of an user associated with an identified object (e.g., an owner of a car), a name of a depicted geographical location, business or park location, or landmark, etc., if such information is available to the image recognition techniques. For example, such identifying information may be available from data sources such as online and/or local databases, user personal data from social network services and other network services (with user permission to access the personal data of users), etc.

In block 322, the method may determine one or more individual scores for the visual content characteristics determined in block 320. In some implementations, each examined type of visual content characteristic (e.g., face, animal, object, landmark, landscape, etc.) can be assigned its own individual score, and these individual scores can be used in blocks 328 and 330 described below. Some implementations can determine an individual score as a combination individual score that includes contributions from multiple different types of visual content characteristics determined in block 320, e.g., a combination of individual scores of the different types of visual content characteristics. In some examples, the individual scores resulting from multiple different types of visual content characteristics can be combined, e.g., using an average, sum, median, etc.

In some implementations, different weights can be assigned to different types of visual content characteristics (e.g., different types of content features). In some examples, generally-appealing content features such as sunsets, beaches, flowers, and popular animals can be given more influential (e.g., higher) weights and cause the resulting individual score(s) to be higher. In contrast, some content features may generally be considered unappealing to general users, such as scenes of degraded areas, garbage, obscene subject matter, etc. and can be assigned a less influential (e.g., lower) weight which cause the resulting individual score(s) to be lower. For example, a higher weighting of a content feature type can cause a higher contribution to a combined individual score of visual content characteristics than if the content feature type were not weighted or lower-weighted.

In some implementations, certain types of content features can be considered always desirable or always undesirable by the method (e.g., undesirable to an operator or user(s) using the method). In one example, some implementations can maintain a list of one or more undesirable content types for which the method can check. For example, as described above, a controller of a website or networked service that is publicly featuring or showcasing quality images uploaded to the site may not wish to have human faces be depicted in featured images. Faces can be detected in the initial blocks 304-306 and the images in which they appear rejected in block 308. However, in some cases, the initial blocks may not have detected one or more faces in the image, and a more robust facial detection technique can be used in block 320 to try to detect one or more faces that may not have been detected in initial blocks. Other types of undesired content may similarly have remained undetected by the initial checks of blocks 304 and 306 and can be more robustly detected in block 320. In another example, a particular website or network service may not desire to ever display certain types of content, such as insects, violent images, etc., in featured images. In some implementations, if such undesirable content is detected, that content can be given a lowest possible weight, e.g., an infinite or other very large magnitude negative weight to cause the associated individual score to be low, e.g., as low as possible. In another example, undesirable content features can include text, e.g., a certain threshold amount or size of text. For example, a system may desire to reduce the presence of text advertisements, personal user names, or other text information in featured images. Some implementations can use a knowledge base and/or database of word meanings to determine semantic meaning of recognized text in an image and determine whether the subject(s) conveyed by the recognized text are undesirable.

In some implementations, images having undesirable content can be excluded from being ranked or selected in blocks 332 and 336, described below. For example, if undesirable content is detected, the method can store an indication for the image (e.g., as metadata) indicating to assign the image a lowest possible rank in block 332 and/or an indication causing the image to never be selected for display in block 336, e.g., similarly as described above for block 308. Some implementations can assign a particular individual score to the image indicating that it should not be selected. For example, a negative score, a score of zero, or other score can be assigned, which can indicate the undesirable status to the method.

In block 324, the method may determine visual capture characteristics for the obtained image. For example, visual capture characteristics can indicate technical visual characteristics of the image, one or more of which may have been created at a time of capture of the image by a camera, e.g., due to environmental conditions of a physical area captured in the image, camera characteristics and settings, etc. Some implementations can include characteristics in the visual capture characteristics that are not related to image capture, and which related to visual appearance of the image. In some examples, visual capture characteristics can include blurriness, exposure level, brightness, contrast, etc. For example, visual capture characteristics can include blurring (e.g., sharpness), where a large amount of blur in the image can be considered lower visual quality and lower desirability. The visual capture characteristics can include exposure level, where a high or low image exposure level outside a predetermined range can be considered a lower visual quality and lower desirability. Similar characteristics can include image brightness, saturation and/or vibrance (e.g., strength of colors in image), contrast, highlights (e.g., bright areas of image with potential loss of detail), shadows (e.g., dark areas of image with potential loss of detail), and/or other types of visual capture characteristics in the image. Such visual capture characteristics can be determined by examining the pixel values of the pixels of the image. The visual capture characteristics can include color noise (and/or other types of visual noise), where noise estimation techniques can be used similarly as described above for blocks 304 and 306. In some implementations, noise estimation techniques can be used in block 324 that require more processing resources than techniques used in block 304, e.g., where block 304 can detect more obvious forms of noise. In some implementations, detected visual capture characteristics in block 324 can include image size or resolution and/or other characteristics.

In some implementations, the method can determine the quality or desirability of one or more of the visual capture characteristics based on machine learning techniques and training techniques. For example, machine learning and training techniques can use ratings or judgments by users or other persons of a large number of images as to their appeal and/or quality. The technique can be trained to find the values or patterns of visual capture characteristics in images that correlate with user approval of those images, e.g., the system can learn which characteristic values or patterns are indicative of higher visual quality. The technique can examine new (unrated) images to search for approved characteristic values or patterns and determine a desirability of the visual capture characteristics. Some implementations can examine pixel values (such as color and brightness values) and/or structures (e.g., edges and textures) or image features (e.g., content features) detected in the pixels. For example, a visual capture characteristic can include image composition, where the image can be scored based on the location of a main subject(s) in the image (e.g., a particular content feature) with respect to the borders of the image, with respect to other content features in the image, etc. In some implementations or cases, visual capture characteristics can be determined based on one or more local regions in the image composed of multiple pixels, e.g., image areas smaller than the entire area of the image.

In block 326, the method may determine one or more individual scores for the visual capture characteristics determined in block 324. In some implementations, each examined type of visual capture characteristic (e.g., brightness, contrast, saturation, noise, etc.) can be assigned its own individual score, and these individual scores can be used in blocks 328 and 330 described below. Some implementations can determine an individual score as a combination individual score that includes contributions from multiple different types of visual capture characteristics determined in block 320, e.g., a combination of individual scores of the different types of visual capture characteristics. In some examples, individual scores resulting from multiple different types of visual capture characteristics can be combined, e.g., using an average, sum, median, etc.

In some implementations, different weights can be assigned to different types of visual capture characteristics. For example, an individual score can be determined for each type of visual capture characteristic and these individual scores combined to determine a combined individual score. In one example, an individual score of a type of visual capture characteristic can be multiplied or otherwise adjusted by an associated weight, and the weighted individual scores for multiple types of visual capture characteristics can be averaged, summed, or otherwise combined to obtain the combined individual score. Some implementations can use other techniques for combining scores. For example, some implementations can assign a more influential (e.g., higher) weight to the brightness of the image than to the saturation of the image. In some examples, a higher weighting of a particular visual capture characteristic can cause a higher contribution to the combined individual score than if the particular visual capture characteristic were not weighted or lower-weighted.

Additional and/or other image characteristics can be evaluated in other implementations, where those characteristics are determined from the image and one or more individual scores are determined for those characteristics. For example, some implementations can examine camera characteristics of the camera that captured the image, e.g., EXIF (Exchangeable image file format) data. In some examples, the method can determine an individual score that is assigned a value indicating higher quality (e.g., a higher value) if the capturing camera has a known higher-quality brand and/or model (e.g., that is known to capture high-quality images). Similarly, the individual score can be assigned a value indicating lower quality (e.g., a lower value) if the capturing camera has a known lower-quality brand and/or model. Various types of regression techniques can be used in, or instead of, any of the machine learning examples described herein.

In block 328, the method weights the individual scores determined in blocks 318, 322, and 326 (and/or any other individual scores determined for other image characteristics). In some implementations, the individual scores can be weighted in a predetermined manner. Various implementations can weight the individual scores in different ways. In some examples, machine learning techniques can be used to determine how to weight each of the individual scores. For example, a large number of images having the characteristics described above can be judged by human judges, and the amount that a particular characteristic contributes to the highest quality images can be estimated based on correlating high quality images with each of the characteristics. In some examples, particular values of the social popularity characteristics described above for block 316 may be found to be highly correlated with images judged to have the best overall visual quality or appeal. As a result, the social popularity characteristics can be weighted by a larger amount than other characteristics that are not as correlated. Visual capture characteristics may be found to also be correlated with judged high quality images, but may be found to be overall less correlated than the social popularity characteristics. The method can weight visual capture characteristic individual score(s) by a less influential amount than the social popularity characteristic individual score(s). In another example, the visual content characteristic individual score(s) can be weighted to be more influential if it is important for a system that undesired types of content features not be depicted in selected and displayed images. In some implementations, each of the individual scores can be weighted by a different amount in the determining of the overall scores.

In block 330, the method combines the weighted individual scores of block 328 into an overall score. For example, the weighted individual scores can be summed, averaged, multiplied, and/or otherwise combined to determine the overall score. In some implementations, the overall score can be stored as metadata for the selected candidate image, or otherwise stored in association with the selected candidate image.

In block 332, the method places the selected candidate image in ranking order based on the overall score. For example, the method can compare the overall score of the selected candidate image to overall scores of other stored ranked images. The method can place the selected candidate image in an appropriate position in an ordered list of ranked images based on the overall scores. In some example implementations, a network service or site places the ranked image in an ordered list of a large number of images submitted by users and which have been ranked by method 300 (or other method or process), such as hundreds, thousands, or more user-submitted images. In various implementations, the images can be ranked and ordered relative to other images that are also newly submitted and being examined, and/or can be ranked and ordered relative to images previously submitted by users (e.g., submitted within a predetermined time period before the current time).

In block 334, the method checks whether there is another candidate image to evaluate, and if so, returns to block 314 to select another candidate image. If there is not another candidate image to evaluate, then the method can continue to block 336 in some implementations.

In block 336, the method selects and provides one or more of the ranked images for display. For example, block 336 can be implemented similarly to block 214 of FIG. 2 described above. In some examples, the method can provide the one or more selected images to a display device of the implementing system, e.g., a server device or a client device. In some implementations, the method can provide the selected images to a system that sends the selected images, e.g., over one or more networks, to be displayed by display devices of one or more server devices and/or client devices. In some implementations, the selected images are provided for display as one or more featured images on a display device of one or more devices. For example, a display device of a user's client device can display a featured image provided to the client device by a server system implementing a network service such as a social networking service and/or photo collection service. A featured image can be displayed in a graphical user interface or application screen, for example. Some examples of displaying featured images are described below with respect to FIG. 4.

In some implementations, the method selects and provides a predetermined number of the ranked images for display. In various examples, the single top-ranking image, the three highest-ranking images, or the 20 highest-ranking images, can be selected and provided for display. Some implementations can select and provide one or more lower ranking images (e.g., non-highest ranking images) for display. In one example, if higher ranking images have previously been selected and displayed, then the next highest ranking image can be selected for display. Some implementations can select one or more images having a randomly-generated rank, e.g., having a random rank that is above a minimum rank threshold.

Some implementations can use image rank and/or other criteria for selecting the one or more images for display. For example, the method can examine both rank and one or more particular individual scores determined for image characteristics to determine which image(s) are selected for display. In one example, the highest ranking image that has a non-zero individual score for the visual content characteristics can be selected, where a zero score for the visual content characteristics can indicate that the image content is of an undesired type for display.

In some examples, the selected image(s) can be tailored for particular users, e.g., to user preferences. For example, the method may be able to determine user preference(s) for each client device that will receive a selected image for display, e.g., based on accessible stored user preference data, stored user activity data (e.g., data describing a history of locations visited, messages sent, events attended, etc. by the user), data stored by social networking databases, or data from other accessible databases (e.g., with user permission to access such personal data).

In some example implementations, for each client device that will receive and display a selected image, the method can select the highest ranking image that also has one or more characteristics preferred by the receiving user of that client device. In some examples, the method can select the highest ranking image that depicts a particular type of content feature (or is included in a particular category) preferred by the receiving user of that client device. For example, the method can select the highest ranking image having a content feature type of "animals" or included in a category of "animals" to send for display by particular client devices associated with users determined to like animals. In some implementations, the categories in which images are placed can be determined based on recognized content features of the images as described above and/or based on user-added labels or keywords, etc. In another example, the method can select the highest ranking image that has been shared to users and/or viewed by users for a threshold or greater number of times (e.g., has a share count and/or view count greater than or equal to the threshold as determined based on the social popularity characteristics of the image). This selected image can be sent for display to particular client devices associated with users determined to prefer popular images and other content (e.g., based on those users' image viewing history). In another example, the method can select the highest ranking image that also has an average brightness that is higher than a threshold brightness (as determined based on the visual capture characteristics of the image), which is sent for display to particular client devices associated with users determined to prefer brighter images and to dislike darker images (e.g., based on those users' submitted images, image viewing history, etc.).

Block 336 can be performed after a number of images have been evaluated (as shown in FIG. 3) or after all available images have been evaluated. In some implementations, block 336 can be performed based on particular conditions being met, e.g., after each image has been evaluated, after a predetermined time period has elapsed since the last selection and display of an image, at a particular time of day, week, month, or year, in response to receiving a user or operator command or request to display an image or other input, in response to receiving a command or request from a connected computing device instructing to provide one or more images for display, and/or in response to one or more other events or conditions.

In some implementations, ranked images that have a submission date and time older than a predetermined time period can be automatically removed from the set of ranked images being considered for selection and display. A new ranked order of images can then be determined and used to select and provide one or more new images for display.

Method 300 thus can determine an overall score that can indicate an overall quality or desirability of the image for display with respect to other images that have been evaluated and provided with overall scores. The overall score can be based on a combination of characteristics, e.g., visual content characteristics, visual capture characteristics, and social popularity characteristics of the image. The overall score can be used to rank the images. One or more of the ranked images can be selected and provided for display by one or more display devices.

In some implementations, one or more of the blocks in method 200 and/or 300 can be performed based additionally on other image characteristics and/or other factors. For example, individual scores and/or overall scores described above can be influenced by other factors related to one or more users that will receive selected images for display at a client device or server device associated with that user, similarly as described above for block 366. In some examples, the factors can include user data, including user preferences data, user geographic location data (e.g., where a particular location may influence weighting of particular types of content features in images), user calendar data (e.g., calendar events attended by a user indicating user preferences), user activity data (e.g., locations and/or events visited by the user), etc. For example, such user data may be available, with user permission, from a user's device or user account in an online network service and/or other data sources. Such user data can assist the method in determining which characteristics of images have appeal and/or significance to the associated user. For example, a user that visits natural park locations frequently (e.g., over a threshold number of times per time period) may be more likely to enjoy images depicting landscape content features, while a user attending many city events may be more likely to enjoy images showing city landmark features. If a particular image characteristic is determined to have user appeal, that characteristic can be weighted higher in determining a combined individual score and/or in determining an overall score for images. This may increase the likelihood that images more suitable to a particular user or group of users will be selected for display. In some implementations, images tailored to users can be selected and provided for display to particular users as described above for block 366. In some implementations, each user or group of users that will receive a selected image for display can be associated with a ranked list of the available images for display tailored for that user or group of users as described above.

In some implementations, method 200 and/or 300 can present multiple selected images to a user for selection, e.g., a user such as an end user viewing the images or an operator of the system selecting the images. For example, the method can select a number of ranked images as described in the various implementations herein, and display those images to the user to allow the user to select one or more preferred images. The user-selected image(s) can be provided to one or more devices to be displayed as a featured image. In some examples, if the user who selected an image is a system operator, the user-selected image can be a featured image provided for display by the system to various receiving devices. If the user who selected the image is an end user using a client device, then the selected image can be a featured image displayed only at that client device. In some implementations, an image receiving a large number (e.g., over a threshold number) of selections by users, or a majority of selections from end users, can be sent to all or a large subset of devices that receive and display featured images.

Various blocks and operations of methods 200 and 300 can be performed in a different order than shown and/or at least partially simultaneously, where appropriate. For example, some implementations can perform blocks of the methods at various times and/or based on events not related to providing an image for display. For example, the initial scores of blocks 304-306 can be determined for some images at the same time that one or more other images are processed in blocks 314-332. Candidate image processing in blocks 314-322 can be performed immediately after blocks 304-312 or at a different time. In some implementations, blocks can occur multiple times, in a different order, and/or at different times in the methods.

In some implementations, the methods 200 and 300 can be implemented, for example, on a server system (e.g., server system 102 shown in FIG. 1). In some implementations, one or more client devices (e.g., client devices shown in FIG. 1) can perform one or more blocks instead of or in addition to a server system performing those blocks. For example, images can be stored on a client device and scores and ranks can be determined and/or stored on a server device, or vice versa.

Figure 4:
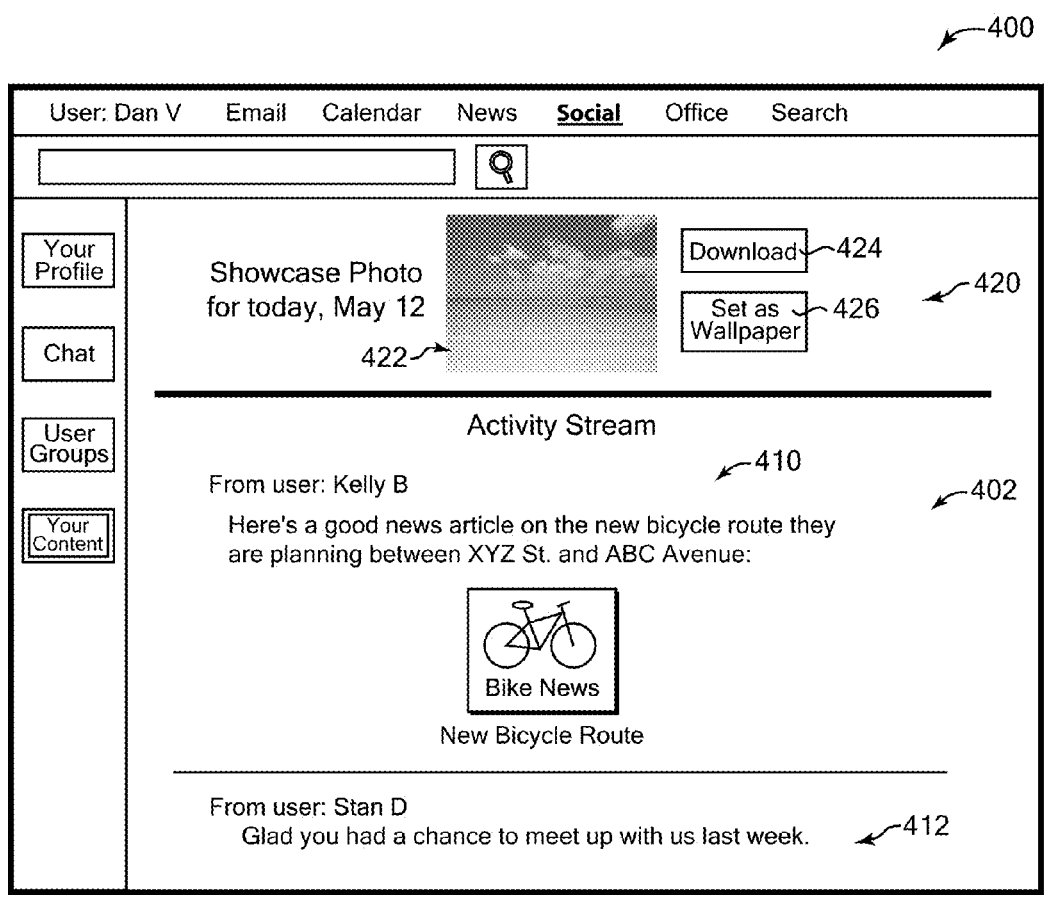
FIG. 4 is a diagrammatic illustration of an example user interface that can display images selected using one or more features described herein.

FIG. 4 is a diagrammatic illustration of an example user interface 400 that can be used with one or more features described herein. In various implementations, user interface 400 can be displayed on a display device, e.g., of a client device 120, 122, 124, and/or 126 of FIG. 1, or a server system 102 in some implementations. In some implementations, images can be processed as described herein and displayed in other types of user interfaces, one or more screens of an application program, or other visual output of a display device. In other implementations, images can be processed as described herein without being displayed, or can be displayed in other ways.

In this example, interface 400 can be a user interface for accessing information provided by a social networking service. For example, a viewing user Dan V can be logged into a user account on the social networking service to view information. The interface can include an activity stream section 402 in which posts from various users of the network system are displayed, such as other users included in user groups formed by the viewing user. For example, a post 410 can be provided by one user and a later post 412 can be provided by a second user, where both of these users are socially linked to the viewing user, e.g., are in the viewing user's user groups. Images that are included in such posts can be evaluated and ranked for overall quality by methods described herein.

Interface 400 can also include a showcase section 420 in which one or more showcased or featured images are displayed. In some examples, the social networking service on a server system can implement one or more features described herein to evaluate submitted images for display, e.g., images that have been posted or otherwise uploaded to the social networking service by users of the service. For example, all images posted by users can be evaluated in some implementations, e.g., images posted to user profiles, included in messages to other users, posted on a public information display or activity stream, etc. Some implementations can exclude from evaluation images that are determined to be private, e.g., images which have not been shared publicly on the system, and/or images which have been shared only to a threshold (or fewer) number of other users on the social network service. In some examples, at a predetermined time, the social networking service can examine and evaluate images that have been submitted by users since the same time on the previous day, or that have been submitted by users during the last occurring predetermined time period (a predetermined number of hours, days, etc.).

The submitted images can be examined and evaluated based on one or more features described above to determine ranks of the images relative to other images. The images can be ranked and ordered relative to other images that are also newly submitted and being evaluated, and/or can be ranked and ordered relative to images previously submitted by users to the social networking service (e.g., within a predetermined time period before the current time).

In some implementations, the social networking service can select and showcase one or more of the highest ranking of the evaluated images. For example, the interface 400 can display the most highly-ranked image 422 in the showcase section 420. For example, image 422 may have had high individual scores for social popularity characteristics (e.g., large numbers of views, positive comments, and instances of sharing to other users), visual content characteristics (e.g., content type of beach landscape, no depicted faces), and visual capture characteristics (e.g., small amount of blur, good exposure level, etc.), leading to the highest overall score for the current set of images being ranked for display in the interface 400. In some implementations, the viewing user is given the option 424 to download the showcased image 422, and/or the option 426 to download and set the image 422 to be displayed as background or wallpaper in a displayed interface of the viewing user displayed by the client device.

In some implementations, the social networking service can evaluate images newly submitted by users after each time period, score and rank the images, and place them in the ranked and ordered list of images. If the top-ranked image becomes a new image, the old displayed image 422 is replaced in the displayed showcase section 420 by the new top-ranked image. In some implementations, the old displayed image 422 can be automatically removed from display after a predetermined time period regardless of whether it is still the top-ranked image any longer, e.g., so as to change the showcased image seen by users. For example, all images that have a submission date and time older than a predetermined time period can be automatically removed from the set of (e.g., candidate) ranked images being considered for display as a showcased image in interface 400. A new ranked order of images can then be determined and used to select a new image and provide that image for display as the featured image 422. In some implementations, an old displayed image 422 can be replaced by the next highest ranked image that has not yet been displayed as the featured image by the social networking service.

Figure 5:
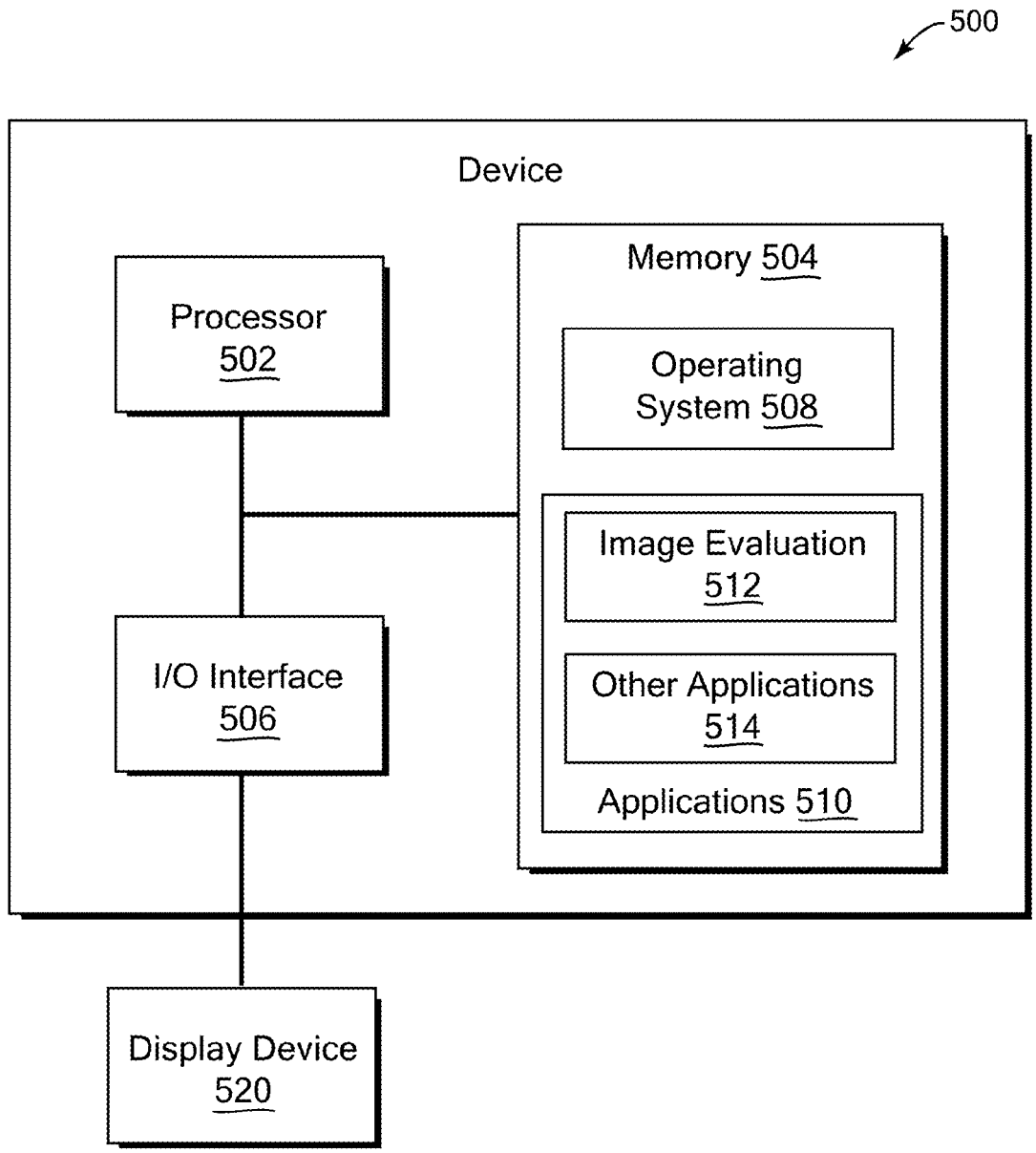
FIG. 5 is a block diagram of an example device which may be used for one or more implementations described herein.

FIG. 5 is a block diagram of an example device 500 which may be used to implement one or more features described herein. In one example, device 500 may be used to implement computer device used to implement a server device, e.g., server device 104 of FIG. 1, and perform appropriate method implementations described herein. Device 500 can be any suitable computer system, server, or other electronic or hardware device. For example, the device 500 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 500 includes a processor 502, a memory 504, and input/output (I/O) interface 506.

Processor 502 can be one or more processors and/or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the server device 500 by the processor 502, including an operating system 508 and one or more applications 510, e.g., a graphics editing engine, web hosting engine, social networking engine, etc. In some implementations, applications 510 can include instructions that enable processor 502 to perform the functions described herein, e.g., some or all of the methods of FIGS. 2 and 3 and/or interface of FIG. 4. For example, applications 510 can include one or more image evaluation applications 512, including an application using one or more features described herein to evaluate images and rank images. An image evaluation application 512 can, for example, output a ranked list of images and/or can provide instructions to display one or more selected images on a display device 520 or on one or more other devices via a network interface. Other applications or engines 514 can also or alternatively be included in applications 510, e.g., image editing applications (e.g., receiving user input, provide a displayed user interface, modifying pixels of images, and displaying images on a display component of the device 500), media display applications, communication applications, web hosting engine or application, social networking engine or application, etc. Any of software in memory 504 can alternatively be stored on any other suitable storage location or computer-readable medium. In addition, memory 504 (and/or other connected storage device(s)) can store images, scores, criteria for scoring, and other instructions and data used in the features described herein. Memory 504 and any other type of storage (magnetic disk, optical disk, magnetic tape, or other tangible media) can be considered "storage devices."

I/O interface 506 can provide functions to enable interfacing the server device 500 with other systems and devices. For example, network communication devices, storage devices (e.g., memory and/or database 106), and input/output devices can communicate via interface 506. In some implementations, the I/O interface can connect to interface devices including input devices (keyboard, pointing device, touchscreen, microphone, camera, scanner, etc.) and/or output devices (display device, speaker devices, printer, motor, etc.). Display device 520 is one example of an output device that can be used to display content, e.g., content included in a computer presentation as described herein. Display device 520 can be connected to device 500 via local connections (e.g., display bus) and/or via networked connections and can be any suitable display device, some examples of which are described below.

For ease of illustration, FIG. 5 shows one block for each of processor 502, memory 504, I/O interface 506, and software blocks 508 and 510. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. While server system 102 is described as performing operations as described in some implementations herein, any suitable component or combination of components of system 102 or similar system, or any suitable processor or processors associated with such a system, may perform the operations described.

A client device can also implement and/or be used with features described herein, e.g., client devices 120-126 shown in FIG. 1. Example client devices can be computer devices including some similar components as the device 500, e.g., processor(s) 502, memory 504, and I/O interface 506. An operating system, software and applications suitable for the client device can be provided in memory and used by the processor, e.g., image evaluation software, image editing software, client group communication application software, etc. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 520, for example, can be connected to (or included in) the device 500 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 200 and/or 300) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., information about a user's social network, user characteristics (age, gender, profession, etc.), social actions or activities, a user's preferences, content created or submitted by a user, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
    selecting a plurality of images as a subset of a set of images based on an initial set of characteristics of the set of images, wherein the initial set of characteristics include a respective privacy characteristic for each image of the set of images that indicates a status of the image as one of a public status or a private status;

after selecting the plurality of images, examining characteristics of the plurality of images, wherein examining the characteristics includes examining visual content characteristics and social popularity characteristics of the plurality of images, wherein the social popularity characteristics are obtained from one or more devices over a network, wherein the social popularity characteristics include a number of times that the plurality of images have been shared between user devices of a plurality of users;

determining individual scores for respective examined characteristics of multiple images of the plurality of images;

determining overall scores of the multiple images based on a combination of the individual scores for the respective examined characteristics of the multiple images;

determining a ranking of the multiple images based on the overall scores;

selecting one or more images of the multiple images based on the ranking of the multiple images; and causing the one or more selected images to be displayed as a background image in a user interface displayed on a display device.

2. The computer-implemented method of claim 1, wherein the social popularity characteristics exclude re-sharings of the plurality of images by the plurality of users to other users of the plurality of users.

3. The computer-implemented method of claim 1, wherein the social popularity characteristics include a number of times that the plurality of images have been positively rated as determined based on user ratings associated with the plurality of images, wherein the individual scores associated with the social popularity characteristics are based on a time elapsed between an occurrence of each particular rating of an image and a previous rating of the image that occurred prior to the particular rating.

4. The computer-implemented method of claim 1, wherein the social popularity characteristics include lengths of times that the plurality of images have been viewed.

5. The computer-implemented method of claim 1, wherein the social popularity characteristics include the number of times the plurality of images have been stored on at least one of one or more favorite lists, one or more bookmark lists, or one or more other lists.

6. The computer-implemented method of claim 1, further comprising determining that the overall scores of the one or more selected images satisfy a threshold score of a predetermined display requirement.

7. The computer-implemented method of claim 1, wherein selecting the plurality of images as the subset of the set of images includes excluding, from the subset, one or more images from the set of images having the private status, wherein the private status is indicative of a restriction on public display of the one or more images.

8. The computer-implemented method of claim 1, wherein the initial set of characteristics include a text characteristic that indicates whether each image of the set of images includes text and, in response to the image including text, includes at least one of a size or a semantic meaning of the text.

9. The computer-implemented method of claim 1, further comprising:

removing a particular image of the one or more selected images from display as the background image after a predetermined time period has expired after causing the particular image to be displayed;

selecting one or more next highest ranking images from the multiple images; and causing the one or more selected next highest ranking images to be displayed as the background image in the user interface displayed on the display device.

10. The computer-implemented method of claim 1, further comprising, after causing the one or more selected images to be displayed:

obtaining one or more additional images;

determining overall scores and ranks of the additional images and updating the ranking of the multiple images with the overall scores and ranks of the additional images; and in response to a particular image of the one or more additional images having a highest rank in the ranking of the multiple images, causing the particular image to be displayed as a background image in the user interface.

11. The computer-implemented method of claim 1 wherein the private status indicates that images associated with the private status are accessible by a specified subset of users of a set of users, and the public status indicates that images associated with the public status are accessible by all users of the set of users.

12. The computer-implemented method of claim 1 wherein images of the set of images that have been determined to depict a face have a default privacy characteristic that indicates the private status.

13. A system comprising:

a storage device; and at least one processor operative to access the storage device and configured to perform operations comprising:

examining characteristics of a plurality of images, wherein examining the characteristics includes examining visual content characteristics and social popularity characteristics of the plurality of images, wherein the social popularity characteristics are obtained from one or more devices over a network, wherein the social popularity characteristics include, for each image of the plurality of images, a number of times that the image has been shared between two or more user devices of a plurality of users, and a number of times that the image has been positively rated as determined based on user ratings associated with the plurality of images;

determining individual scores for respective examined characteristics of multiple images of the plurality of images, wherein the individual scores associated with the social popularity characteristics include scores based on a time elapsed between an occurrence of each particular user rating of an image and a previous user rating of the image that occurred prior to the particular user rating;

determining overall scores of the multiple images based on a combination of the individual scores for the respective examined characteristics of the multiple images;

selecting one or more images of the multiple images based on the overall scores of the multiple images; and causing the one or more selected images to be displayed as a background image in a user interface displayed on a display device.

14. The system of claim 13, further comprising determining a ranking of the multiple images based on the overall scores, wherein selecting the one or more images of the multiple images is based on the ranking of the multiple images.

15. The system of claim 13, wherein the social popularity characteristics exclude re-sharings of the plurality of images by the plurality of users to other users of the plurality of users.

16. The system of claim 13, wherein the social popularity characteristics include lengths of time that the plurality of images have been viewed.

17. The system of claim 13, wherein the social popularity characteristics include the number of times the plurality of images have been stored on at least one of one or more favorite lists, one or more bookmark lists, or one or more other lists.

18. The system of claim 13, further comprising, prior to the examining the characteristics:

selecting the plurality of images as a subset of candidate images from a set of images based on an initial set of characteristics of the set of images, wherein the initial set of characteristics include a respective privacy characteristic for each image of the set of images that indicates a status of the image as one of a public or a private status.

19. A non-transitory computer readable medium having stored thereon instructions to provide selected images for display and, when executed by a processor, cause the processor to perform operations comprising:

determining a subset of candidate images from a plurality of images based on an initial set of characteristics of the plurality of images, wherein the initial set of characteristics include at least one of:

a respective privacy characteristic for each image of the plurality of images that indicates a status of each image of the plurality of images as one of a public status or a private status; or a text characteristic that indicates whether each image of the plurality of images includes text and, in response to the image including text, includes at least one of a size or a semantic meaning of the text;

examining characteristics of the subset of candidate images, wherein examining the characteristics includes examining visual content characteristics and social popularity characteristics of the subset of candidate images, wherein the social popularity characteristics are obtained from one or more devices over a network, wherein the social popularity characteristics include a number of times that the subset of candidate images have been shared between user devices of a plurality of users;

determining an individual score for each of the characteristics for each of the candidate images in the subset;

determining overall scores of the candidate images in the subset based on a combination of the individual scores for the respective examined characteristics of the subset of candidate images;

determining a ranking of a plurality of the candidate images in the subset based on the overall scores;

selecting one or more highest ranking candidate images based on the ranking of the plurality of the candidate images; and causing the one or more selected highest ranking candidate images to be displayed as a particular image in a user interface displayed on a display device during idle times of a user device associated with the display device.

20. The non-transitory computer readable medium of claim 19, wherein the operation of determining the subset of the candidate images includes excluding, from the subset of the candidate images, one or more images of the plurality of images having the private status, wherein the private status is indicative of a restriction on public display of the one or more images.

* * * * *